United States Patent [19]
Lynam et al.

[11] Patent Number: 5,384,578
[45] Date of Patent: * Jan. 24, 1995

[54] ELECTROCHROMIC DEVICE CAPABLE OF PROLONGED COLORATION

[75] Inventors: Niall R. Lynam; Ian A. McCabe, both of Holland; Kenneth L. Schierbeek, Zeeland, all of Mich.

[73] Assignee: Donnelly Corporation, Holland, Mich.

[*] Notice: The portion of the term of this patent subsequent to Jun. 15, 2010 has been disclaimed.

[21] Appl. No.: 77,245

[22] Filed: Jun. 14, 1993

Related U.S. Application Data

[63] Continuation of Ser. No. 625,946, Dec. 11, 1990, Pat. No. 5,220,317.

[51] Int. Cl.$^6$ .......................... G09F 9/32; G02F 1/01
[52] U.S. Cl. .................................. 345/105; 345/212; 359/271
[58] Field of Search ............... 340/785, 784, 763, 813, 340/814, 811; 359/270–275, 254, 267, 604, 605, 265; 250/206; 345/49, 89, 105, 106, 147, 211–214

[56] References Cited

U.S. PATENT DOCUMENTS

| | | |
|---|---|---|
| 3,938,131 | 2/1976 | Van Doorn et al. |
| 3,987,433 | 10/1976 | Kennedy |
| 4,045,791 | 8/1977 | Fukai et al. |
| 4,117,475 | 9/1978 | Ebihara et al. |

(List continued on next page.)

FOREIGN PATENT DOCUMENTS

| | | |
|---|---|---|
| 0280278 | 8/1988 | European Pat. Off. |
| 57-173801 | 10/1982 | Japan |
| 57-208530 | 12/1982 | Japan |
| 57-208531 | 12/1982 | Japan |
| 61-54942 | 4/1986 | Japan |
| 61-56638 | 4/1988 | Japan |

OTHER PUBLICATIONS

Publication entitled "Electrochromism of Organic Compounds, Some Properties of Two–Electrode Cells" by Ushakov O. A. et al., Moscow, Feb., 1978.

Publication entitled "Smart Windows for Automobiles", SAE Technical Paper Series, Feb. 26–Mar. 2, 1990.

Publication entitled "Electrochromic Automotive Day/Night Mirrors", SAE Technical Paper Series, Feb. 23–27, 1987.

*Primary Examiner*—Richard Hjerpe
*Assistant Examiner*—Steven J. Saras
*Attorney, Agent, or Firm*—Price, Heneveld, Cooper, DeWitt & Litton

[57] ABSTRACT

An elecctrochromic system utilizes the benefit both from the continuous variability in transmission and memory in EC devices to provide a partial level of light transmission that is variable while minimizing energy usage. An electrochromic element that is responsive to a momentary application of a signal by coloring to a corresponding partial transmission level and maintaining at that level for a given period of time after removal of the drive signal, is provided with a drive signal. The drive signal has a value corresponding to a selected transmission level and is applied for a first predetermined period of time in order to color the electrochromic element to the selected transmission level and repetitively thereafter for the same or shorter periods of time. The subsequent periods are separated from each other and from the first period by holding periods of time during which the drive signal is not applied. A reset circuit resets the drive circuit to apply the changed value of the drive signal in response to changes in the selected light transmission level. An additional circuit may be provided that is responsive to the magnitude and/or rate of change of magnitude of the selected light transmission level in order to provide momentary overshoot of the drive signal level upon a change that increases the drive signal level and a momentary undershoot of the drive signal upon a change that decreases the drive signal level.

39 Claims, 11 Drawing Sheets

U.S. PATENT DOCUMENTS

| | | |
|---|---|---|
| 4,150,362 | 4/1979 | Uede et al. . |
| 4,173,758 | 11/1979 | Sekine . |
| 4,201,985 | 5/1980 | Inami et al. . |
| 4,205,903 | 6/1980 | Inami et al. . |
| 4,209,770 | 6/1980 | Hamada et al. . |
| 4,246,579 | 1/1981 | Wiesner . |
| 4,295,138 | 10/1981 | Nakauchi et al. .................... 340/785 |
| 4,298,870 | 11/1981 | Saequsa . |
| 4,300,138 | 11/1981 | Nakauchi et al. . |
| 4,309,082 | 1/1982 | Kohara et al. . |
| 4,312,000 | 1/1982 | Uede et al. . |
| 4,322,133 | 3/1982 | Uede et al. .......................... 340/785 |
| 4,346,964 | 8/1982 | Ishihama et al. . |
| 4,367,469 | 1/1983 | Hashimoto . |
| 4,512,637 | 4/1985 | Ballmer . |
| 4,529,275 | 7/1985 | Ballmer . |
| 4,529,873 | 7/1985 | Ballmer et al. . |
| 4,572,619 | 2/1986 | Reininger et al. . |
| 4,649,382 | 3/1987 | Martin et al. . |
| 4,712,879 | 12/1987 | Lynam et al. . |
| 4,741,603 | 5/1988 | Miyagi et al. . |
| 4,793,690 | 12/1988 | Gahan et al. . |
| 4,886,960 | 12/1989 | Molyneux et al. . |
| 4,892,394 | 1/1990 | Bidabad . |
| 4,896,030 | 1/1990 | Miyaji . |
| 4,917,477 | 4/1990 | Bechtel et al. . |
| 5,007,718 | 4/1991 | Minoura et al. .................... 340/785 |
| 5,076,673 | 12/1991 | Lynam et al. . |

ELECTROCHROMIC DEVICE CAPABLE OF PROLONGED COLORATION

This is a continuation of application Ser. No. 07/625,946, filed Dec. 11, 1990, now U.S. Pat. No. 5,220,317.

BACKGROUND OF THE INVENTION

This invention generally relates to variable light transmitting systems and more particularly to those devices used in applications where it is desired to electrically select a low transmission state and then maintain this transmission state for prolonged periods. The invention is especially useful with mirror systems utilizing continuously variable reflectance elements, such as electrochromic elements. The invention also finds application in vehicle sunroofs and windows and in other glazing found in buildings and offices such as privacy and security panels in office partitions, vehicle windows and the like.

Variable transmission devices, such as electrochromic windows and mirrors, color under the application of electrical command signals. Such devices exhibit a continuously variable transmission characteristic whereby the transmission in the dimmed, or colored, state is determined by the construction and design of the device, and by the level of signal applied thereto. In such devices, a partial light transmission level is selectable from a continuum of light transmission levels in a range from a highest light transmission level to a lowest light transmission level. Electrochromic variable transmission devices include in their construction materials that color under an applied electrical voltage drive or current. Many device constructions are possible, as disclosed in "Electrochromic Automotive Day/Night Mirrors" SAE Publication 870636, published February 1987, by Niall R. Lynam, and "Smart Windows for Automobiles" SAE Publication 900419, published February 1990, by Niall R. Lynam. Such variable transmission mirrors and windows have a plurality of possible applications. Several of the applications require that the device be colored to a desired lower partial transmission state (or reflectance level in the case of mirror devices) and that this desired lower transmission state be maintained for prolonged periods ranging from several minutes in some applications to several hours or days in others. For example, where the application is a variable transmission window such as an electrochromic sunroof, it would be desirable to dim the transmission of solar radiation through such window by coloring the variable transmission device to some desired low transmission level and then maintain the selected low transmission level for several hours, even while the vehicle is parked or when the vehicle is operated during a journey of extended distance.

In the case of a rearview mirror in a vehicle, it would be desirable at night to dim the reflectance level of the mirror to a selected lower reflectance level to provide protection from glare produced by following headlamps. In another example, where the variable transmission element is an architectural window such as is found in office buildings, homes, and the like, it would be desirable to select some low transmission level during periods of prolonged intense solar radiation. In the examples above, it is contemplated that, once a desired transmission state is selected, and once this desired lower transmission state is achieved by applying an appropriate voltage to the variable transmission device, this selected lower transmission state is desired maintained (or as close to the selected lower transmission state as is consumer discernible) for a prolonged period of at least some minimum period such as several minutes, and often for several hours.

The level of transmission to which an electrochromic device dims is a function of several factors, including the design and construction of the device as well as the applied voltage signal level. Any level of light transmission within the achievable range of transmission levels for the particular device can be accessed by applying the appropriate drive signal level. Upon application of that signal, electrochromic reactions are stimulated within the electrochromic materials, reactions that typically involve redox reactions and some type of ion or molecular transport. Conventionally, the drive signal appropriate to stimulate a determined level of electrochromic reaction, and thereby achieve the selected desired lower transmission state, is maintained throughout the period over which the particular lower transmission state is desired. Such electrochromic devices are typically returned to a higher transmission state, typically known as bleaching, by applying a signal of reverse polarity to that used to color the device to the dimmed, lower transmission state. Alternatively, the electrochromic device may be bleached by applying 0.0 V across the device, such as by short-circuiting its electrodes.

The electrochromic reaction that leads to the coloration of the transmission device may not be the only electrochemical reaction occurring within the device. Side reactions are possible, with the probability of occurrence increasing with the level of applied drive signal required to increase the coloration of the device. The side reactions often lead to device degradation and noticeable cosmetic defects. Therefore, when the drive signal is applied to the device for prolonged periods, the device reaches a steady state level of light transmission, beyond which there is no additional beneficial electrochromic coloring effect. However, the application of the drive signal continually drives the side-reactions so that the long-term reliability of the device may be impaired. Additionally, coloration of the electrochromic device often includes dual injection (or ejection) of electrons and ions. Beyond a certain level of electron and ion injection/ejection, any further injection/ejection can lead to a diminishing incremental coloring efficiency and lead to problems of reversing the reactions when it is desired to bleach the colored layers.

Also, electrochromic devices typically dim when a DC potential is applied; the voltage level is typically in the 0.5 V to 2.0 V range. However, the voltage source available in automobiles is typically 12 V DC and that available in buildings is usually 110 V AC (220 V AC in Europe). Thus, voltage reduction means and, in the case where the power source is AC, rectification and smoothing means, must be utilized to convert the voltage source available to the DC lower voltages needed to power EC devices. Thus, any current leakage whatsoever during prolonged coloration while voltage is applied due to electrochemical side reactions, pinholing that leads to micro-shorts, leakage currents across dielectrics, and the like is particular energy inefficient in that, besides not contributing to a consumer appreciable electrochromic effect, power is wasted in the power supply circuitry utilized to provide said electrochromic coloring voltage. Therefore, continued application of a drive signal in order to achieve a particular level of light transmission is considered detrimental.

Many electrochromic devices retain their coloration state even when the drive signal, which has been applied to achieve the coloration state, is removed. Electrochromic devices that have this property, commonly known as memory, are energy-efficient. Electrochromic devices that have good memory typically involve a thin-film (usually an inorganic metal oxide such as tungsten oxide or nickel oxide, or an organic thin film such as Prussian Blue or polyaniline) that colors electrochromically when a voltage is applied thereto, separated from a counterelectrode (which itself may be electrochromic) by an ion-conducting, electron-insulating electrolyte. This electrochromic combination is, in turn, typically sandwiched between electron conducting electrodes, one at least of which is usually a transparent conductor such as indium tin oxide.

When a voltage is applied to the device, the electrochromic layer usually colors by dual injection/ejection of electrons and ions. As such, the electrochromic layer acts as a charge storage layer making the electrochromic device function in a manner analogous to a capacitor. For a given applied level of voltage, a given charge builds up within the electrochromic layer and, commensurate with the amount of charge built-up, the electrochromic layer colors. Upon removal of the applied, charging voltage such that the device electrically "floats", the charge remains within the electrochromic layer and the electrochromic device remains colored. The duration over which the charge that is built up in the electrochromic layer remains after removal of the charging potential is finite. Eventually, the stored charge leaks away and the light transmission level steadily increases until the electrochromic device returns to a fully bleached state. The period over which this occurs can vary between several minutes for some electrochromic devices to several hours or even days for others.

Therefore, as described above, when an electrochromic device has appreciable memory, it is unnecessary and undesirable to continually maintain the coloring voltage applied once the device has colored to its targeted lower transmission state. Thus, if an electrochromic device had infinite memory, or, alternatively, if the memory was so long that no appreciable upward drift in transmission level was detectable by the consumer or discernible over the time period over which the targeted lower transmission state was desired maintained, then it would suffice to simply color the device to the lower transmission level, and once this was reached, then remove the coloring voltage so that the electrochromic device floats. Thereafter, memory would maintain the desired lower transmission level until such time as a change to some other transmission level was desired whereupon an appropriate bleaching (or coloring) potential would be reapplied. However, not all devices have sufficiently long memory for the device memory itself to be relied upon to sustain a selected lower transmission level indefinitely. Charge leaks from the colored electrochromic medium by several routes such that bleaching, at a very slow rate for long memory devices and at a somewhat faster rate for shorter memory devices, commences immediately the coloring voltage is removed.

U.S. Pat. No. 4,298,870 issued to Saegusa discloses a technique for utilizing the memory property in an electrochromic display element to intermittently drive the display element. Means are provided for detecting the quantity of charge stored in the display element and for generating a detection signal when the detected value of the stored charge is below a predetermined value. Drive means are provided to apply a voltage signal to the display element when a display command signal and the detection signal are both present. In this manner, the drive signal is applied intermittently to the display element. While the principles set forth in the Saegusa patent work well for a display device in which the electrochromic layer is either colored or not colored, it does not provide a mechanism for utilizing the memory property of electrochromic elements with either a window device or a rearview mirror in a vehicle, wherein the degree of coloration of the light transmission element is continuously variable within a range of values.

Thus, a need clearly exists for means to allow selection of some dimmed state in transmission of an electrochromic device and to ensure that the transmission of the device is maintained, over a prolonged time period, close to that selected dimmed transmission state. Further these means should greatly reduce the severity of the energy inefficiency, degradative side-reaction; and allied disadvantages that accompany prolonged application of a coloring voltage to maintain said selected dimmed transmission level. Also, these means should be economical to manufacture and utilize and should be especially well-suited to the cost and performance expectations normal for automobile components. Finally, these means should perform satisfactorily regardless of the operating conditions, including its temperature of operation, of the electrochromic device, and these means should operate satisfactorily over the entire device lifetime.

SUMMARY OF THE INVENTION

The present invention provides an electrochromic system which takes advantage of the memory feature of an electrochromic element while providing a level of light transmission that is variable. The invention is embodied in an electrochromic system having an electrochromic element that is responsive to a momentary application of a signal by coloring to a corresponding partial transmission level and by maintaining the transmission level for a given period of time after removal of the drive signal that produces the transmission level. The period of time in which the transmission level increases by a given percentage is defined as the memory time constant of the electrochromic element. Input means are provided for selecting a light transmission level for the electrochromic element. A circuit means, which is responsive to the input means, applies a drive signal to the electrochromic element having a valve corresponding to the selected transmission level. The drive signal value is applied for a first predetermined period of time in order to color the electrochromic element to the selected transmission level and repetitively thereafter for the same, or shorter, periods of time. The subsequent periods are separated from each other and from the first period by a holding period of time during which the drive signal is not applied. The holding period is predetermined as a function of the memory time constant of the electrochromic element.

According to another aspect of the invention, sensing means are provided that respond to changes in the value of the drive signal that establishes the transmission level. The sensing means resets the circuit means in order to apply the current value of the drive signal for the first predetermined period of time in order to color or bleach the transmission element to the newly selected level. In one embodiment of the invention, the input means for selecting the light transmission level is a discrete switch which selects from a finite number of discrete light transmission levels. In this embodiment, the sensing means is responsive to changes in the setting of the switch means. In another embodiment of the invention, the sensing means is directly responsive to the rate or magnitude of change of the drive signal applied to the electrochromic element. This embodiment is useful with an input means that provides a continuously variable adjustment of the transmission level of the electrochromic element.

According to another aspect of the invention, the circuit means includes means for applying a bleach signal to the electrochromic element for a predetermined period of time followed by a quiescent period during which the bleach signal is not applied. According to yet another aspect of the invention, circuit means are provided that meet the above objectives but that, upon selection for the element of some other transmission state than that first selected, interrupts the established cycle, resets the sequence, adjusts the level of applied voltage to that newly selected, and then recommences the color/float/color sequence.

These and other objects, advantages and features of this invention will become apparent upon review of the following specification in conjunction with the drawings.

DESCRIPTION OF THE PREFERRED EMBODIMENT

Figure 1:
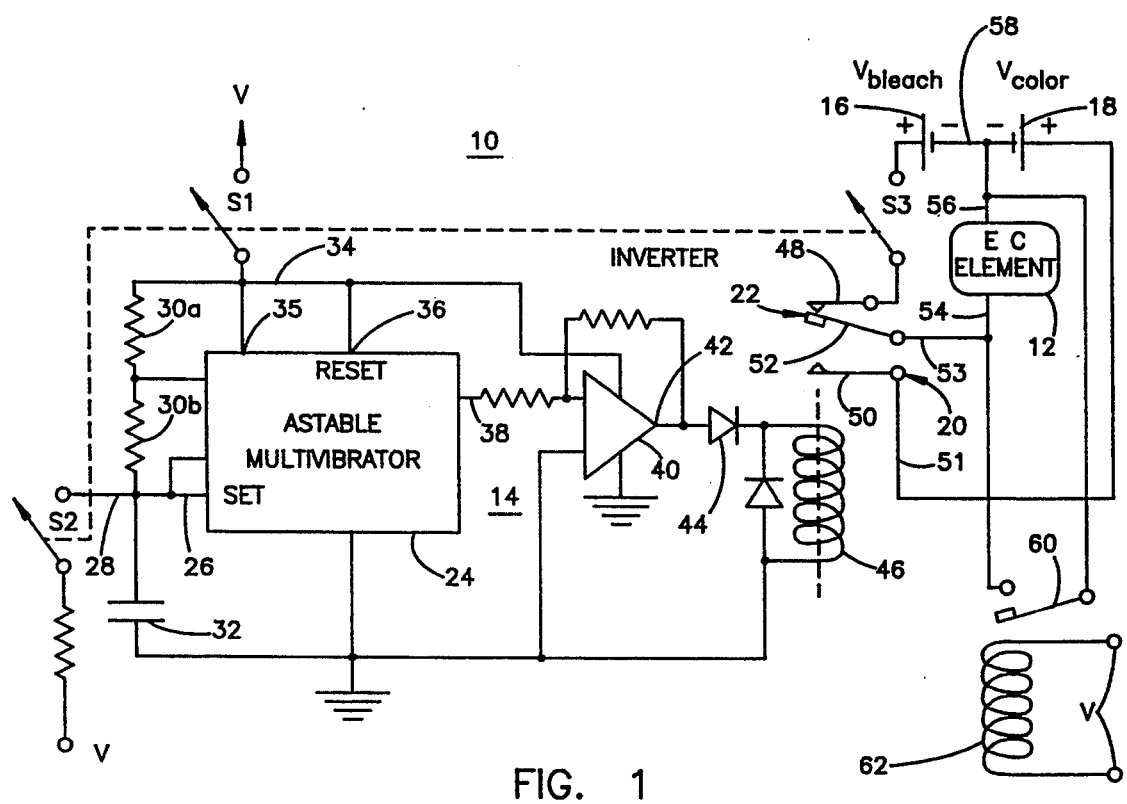
FIG. 1 is an electrical schematic diagram of a variable electrochromic light transmission system according to the invention.

Referring now specifically to the drawings, and the illustrated embodiments depicted therein, an electrochromic light transmission system 10 includes an electrochromic element 12 and a drive circuit 14 capable of producing drive signals which, when applied to EC element 12, modify the light transmission characteristics of the EC element (FIG. 1). In the illustrated embodiment, EC element 12 may be combined with a reflective layer to provide a rearview mirror or may be a window or a sunroof in a vehicle or other glazing found in buildings and offices. Drive circuit 14 includes a bleach signal source 16, a color signal source 18, and switch means, generally illustrated at 20 for selectively applying signal sources 16 and 18 individually across EC element 12. Although signal sources 16, 18 are illustrated as fixed value DC voltage supplies, it should be understood that such representations are for the purposes of illustration only and that the color signal source 18, and the bleach signal source, may be variable level signal sources in order to provide a variable level of light transmission characteristics of EC element 12 as well as variation in the rate of change of light transmission characteristics of the EC element.

A switch means 20 is generally illustrated as including a switching relay 22, and ganged switch members S1 and S3. Although switch members S1 and S3 are illustrated as mechanically interconnected switches, it should be understood that the switching function may be performed by solid state switches or other switch means. Drive circuit 14 includes an astable multivibrator 24 having a set input 26 connected to a junction 28 defined between series resistors 30a, 30b and capacitors 32a and 32b. Capacitor 32b, which has approximately one third of the combined capacitance of 32a, 32b ensures that when switch S1 is closed to color the electrochromic element 12, the signal on output 38 is in a low state for a time period of the same duration as subsequent recoloration periods. If capacitor 32b is not used, the time duration of the initial coloration period could be approximately double that of subsequent recoloration periods. Multivibrator 24 additionally includes a reset input 36 connected with junction 34. Junction 34 is connected through switch S1 to voltage source V such that, when switch S1 is closed, multivibrator 24 produces a repetitive pulsed signal on its output 38. output 38 is, in turn, connected through a diode 44 to a coil 46 of relay 22. Relay 22 includes a first stationary contact 48 connected through switch S3 to bleach signal source 16 and a second stationary contact 50 connected directly with color signal source 18. Relay 22 additionally includes a movable contact 52 connected with a first input terminal 54 of EC element 12. EC element 12 has a second input terminal 56 connected with a junction 58 between signal sources 16 and 18. Input terminals 54, 56 are connected with a set of contacts 60 selectively closed by a relay coil 62.

Figure 6:
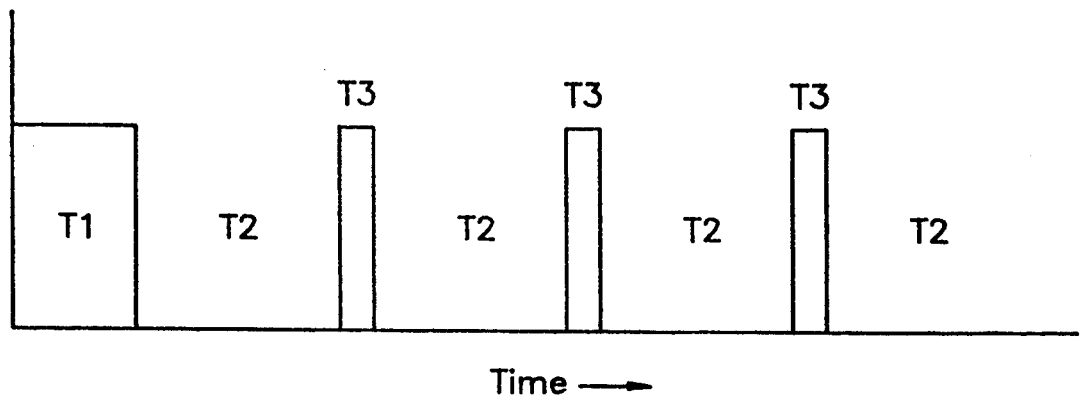
FIG. 6 is a chart illustrating a sequence of drive signals according to the invention.
Figure 5:
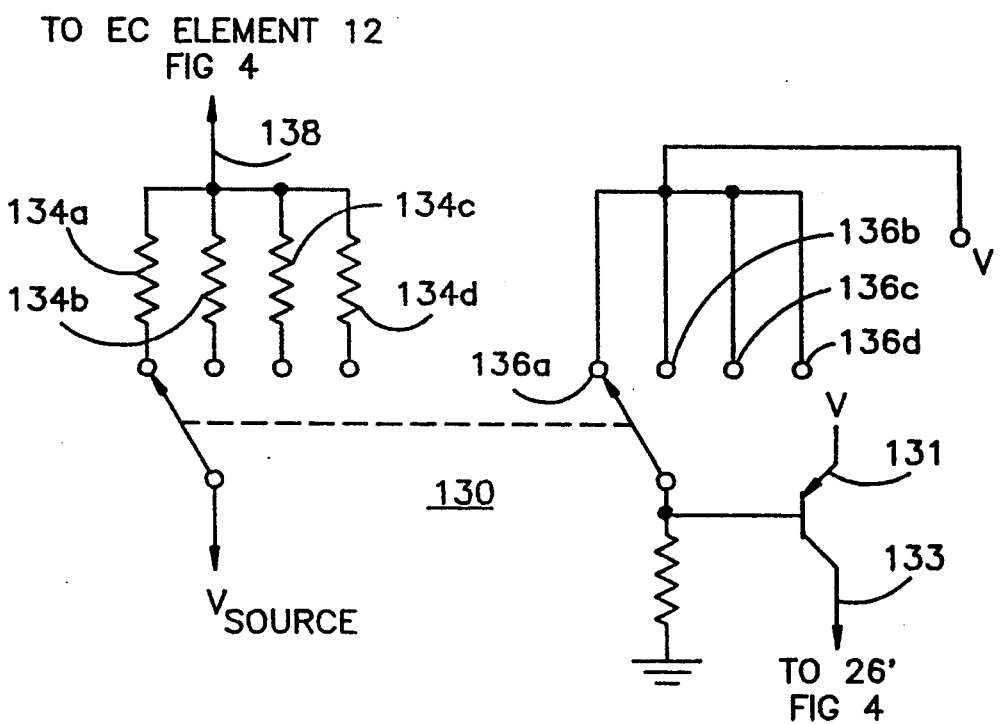
FIG. 5 is an electrical schematic diagram of a sensing circuit useful with the invention.

When it is desired to dim the light transmission characteristics of EC element 12, switch S1 is closed and switch S3 concurrently opens. This applies voltage V to junction 34 which causes multivibrator 24 to produce a periodically pulsed output on its output 38 during periods T₁ and T₃ (FIG. 6). The pulses on line 38 periodically energize and de-energize coil 46. When coil 46 is energized, contacts 50 and 52 are closed in order to apply color signal source 18 across terminals 54, 56 of EC element 12. This occurs when the signal on line 38 is low. When the signal on line 38 rises, coil 46 is de-energized which causes contact 52 to engage contact 48. This removes color signal source 18 from EC element 12 at the beginning of period T₂. The bleach signal source 16 is not applied to the EC element because of the open-circuit state of switch S3. The value of resistors 30a, 30b and capacitors 32a and 32b are selected in order to energize relay 22 for a period of time $T_1$ sufficient to allow EC element 12 to color to the level established by color signal source 18 and to recharge EC element 12 to the desired level during subsequent closures of relay 22, period $T_3$ (FIG. 6). In system 10, periods $T_3$ have the same duration as period $T_1$. Periods during which relay 22 is not energized, period $T_2$, are predetermined to be substantially greater in length than either period $T_1$ or period $T_3$ but not so long as to allow the light transmission of EC element 12 to change, for example, by more than 5%.

When it is desired to increase the light transmission of EC element 12 by applying a bleach signed source thereto, switch S1 is opened and switch S3 closes. With S1 open, multivibrator 24 will not produce negative-going pulses on output 38 because power is removed from power supply terminal 35. With relay 22 thus not energized, contacts 52 and 48 will be engaged which will apply bleach signal source 16 through switch S3 across terminals 54 and 56 of EC element 12. This state will continue until there is a change in state of switches S1 and S3 when it is desired to again color EC element 12 to a lower level of light transmission. Relay 62 is optionally provided in order to cause element 12 to rapidly bleach to a high light transmission condition if power is removed from drive circuit 14. Voltage V is applied to the terminals of relay 62 to hold contacts 60 in an open condition. When voltage V is removed or goes to a low level, relay coil 62 cannot keep contacts 60 open which results in a short circuit being placed across EC element 12. Relay coil 62 thus serves as a means to ensure that, should power to the circuit be interrupted when the EC element is in a dimmed state, the EC element rapidly achieves a high transmission state. In certain applications, such as rearview mirrors, this is an important safety feature. When dimming is selected, the coloring voltage is applied for (to cite an example) 100 seconds and is then lifted (floated) for 1000 seconds and so on. At any moment in the cycle, whether during the applied voltage portion or the float portion, selection of the bleached, high transmission state (either by manual activation, engagement of the reverse gear, or by equivalent means) causes the EC element to bleach (either by short-circuiting or by application of a reverse polarity voltage). This also causes the coloration control circuit to reset and be prepared to restart the color-float cycle when coloration is next required.

A consumer can generally only detect, and generally only cares about, increases in transmission level (or increases in reflectivity for mirror devices) of 5% approximately. Therefore, a useful method to quantify memory is to define "memory time constant" to be the time taken, after first removal of the applied coloring voltage, for the transmission level to rise by 5% transmission. Thus, if, for example, an electrochromic window had been dimmed to 10% transmission and the applied voltage then lifted, a consumer would begin to notice a change in window performance only when the transmission had risen to 15%, or thereabouts. However, if the memory time constant is short and/or the period after lifting the applied voltage is particularly extended, then the transmission level would continue to steadily rise until eventually the consumer would discern that the window was no longer dimmed, as it had been when first activated. This may lead to an unsatisfactory evaluation of the performance and value of the electrochromic window. As another example, suppose a driver dimmed an electrochromic sunroof, with a relatively short memory time constant, to a 10% solar transmission and then parked the car, anticipating that the electrochromic sunroof so dimmed to a 10% transmission would maintain the interior cabin temperature at some comfort level by reason of its greatly reduced solar transmission. The applied voltage would need to be continually applied (with all the above described disadvantages in terms of potential device degradation, energy inefficiency including battery drain, etc.) should the vehicle be parked for an extended period much longer than the memory time constant (recall this is herein defined as the time period for the transmission to rise by 5%). Otherwise, the electrochromic sunroof would progressively self-bleach and the driver could return, some hours later, to a hot interior cabin and be disappointed with the performance of the electrochromic sunroof.

As another example, suppose an electrochromic rearview mirror had a memory time constant of 15 minutes. Suppose also that at the start of a journey, at night, a driver chose to dim the reflectivity to 20% to provide a comfort level as protection against eye fatigue from headlamp and general street lighting glare. Suppose that, upon first reaching the 20% reflectance comfort level, circuit means were used to lift the applied voltage so that device memory was solely relied upon to sustain the dimmed reflectivity level. Then, within the first 15 minutes of the journey, the reflectivity would rise to 25%; after the following 15 minutes, it would rise to about 30% and so on and so on until the highest reflectance level was reached. Thus, the antiglare performance would be steadily deteriorating, leading to driver dissatisfaction with the performance of the electrochromic mirror.

Figure 2:
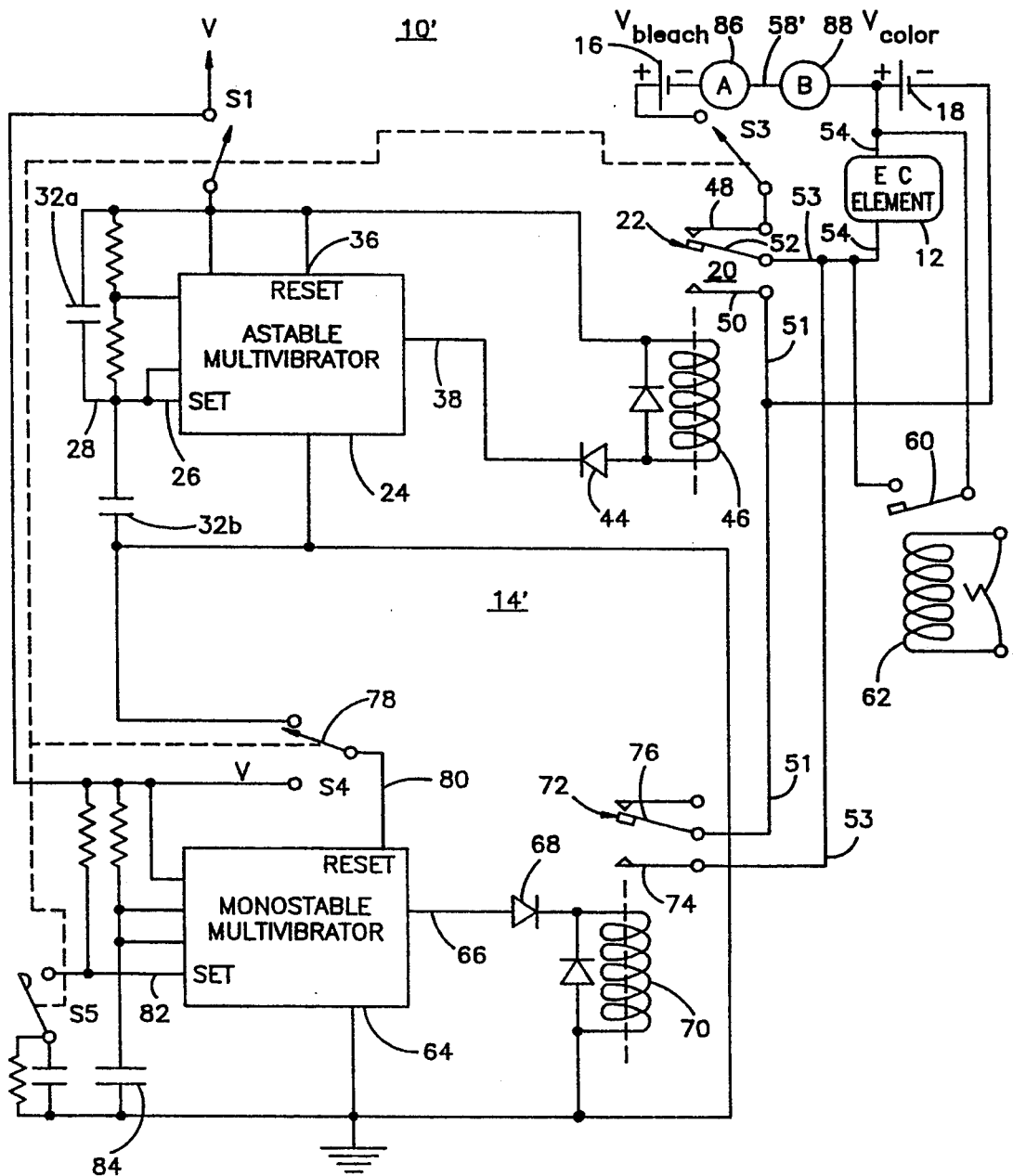
FIG. 2 is an electrical schematic diagram of another embodiment of a variable electrochromic light transmission system according to the invention.

Electrochromic light transmission system 10' (FIG. 2) is capable of providing an initial coloration period $T_1$ that is longer in duration than the subsequent recoloration periods $T_3$ (FIG. 6). EC light transmission system 10' has an EC drive circuit 14' including an astable multivibrator 24, which functions substantially in the same manner as in FIG. 1 and a parallel monostable multivibrator 64. Multivibrator 64 includes an output 66 which is connected through a forwardly poled diode 68 to solenoid coil 70 of a second relay, generally shown at 72. A fixed contact 74 of relay 72 is connected with line 53 and movable contact 76 of relay 72 is connected with line 51. A switch S4 has a movable contact 78 connected with reset input 80 of multivibrator 64. Contact 78 alternates between contact with voltage source V and signal ground. A switch S5, which along with switch S4 is mechanically interlocked with switches S1 and S3, extends between signal ground and a set input 82 of multivibrator 64 Capacitor 84 establishes the width of the single negative-going pulse produced on output 66 in response to the set input 82 of multivibrator 64 being momentarily pulled to ground by the closure of switch S5. The negative going pulse on output 66 is predetermined to be longer in duration than the first pulse produced on output 38 from multivibrator 24.

When it is desired to dim EC element 12 in light transmitting system 10', switches S1 and S5 are closed concurrently with switch S3 being opened and switch S4 being connected to V. When this occurs, output 38 goes low and output 66 goes high, which pulls-in relays 22 and 72. This causes contacts 50 and 52 and contacts 74 and 76 to close, applying color signal source 18 across terminals 54, 56 of EC element 12. At the end of the period having a duration $T_3$, output 38 will switch to a high state which will deenergize relay 22 causing contacts 48 and 52 to engage. This will not change the transmission state of EC element 12 because relay 72 will stay energized which will continue to connect line 51 with line 53 through contacts 74 and 76. Because switch S3 remains open, bleach signal source 16 remains out of the circuit. At the end of period $T_1$ defined by monostable multivibrator 64, line 66 will switch to a low state which will deenergize relay 72 causing contact 74 and 76 to separate. This allows the astable multivibrator 24 to thereafter control the coloration, float and recoloration periods of EC element 12.

This continues until it is desired to bleach EC element 12. This is accomplished by opening switches S1 and S5, closing switch S3 and switching S4 to ground. The grounding of switch S4 resets input 80 of multivibrator 64 in order to force its output 66 to a low state concurrently with the opening of switch S1 causing astable multivibrator 24 to reset. This causes both relays 22 and 72 to deenergize. With relay 22 deenergized and switch S3 closed, bleach signal source 16 will be applied across EC element 12. Of course, power signal source 18 is isolated by the separation of contacts 52 and 50 and 74 and 76. If supply voltage V is removed from system 10' relay coil 62 will deenergize, closing contact 60 to apply a short circuit across terminals 54, 56 to EC element 12 to rapidly bleach the element.

Circuit 10' (FIG. 2) is an improvement over circuit 10 (FIG. 1) in that the integrated duration over which the voltage is applied during a period of prolonged coloration is greatly reduced. On first dimming, the coloring voltage is applied (for example) for 100 seconds. However, it is wasteful, and unnecessary, to apply the voltage for a full 100-second period after each period of float $T_2$. This is because only a portion of the charge stored in the electrochromic medium will have leaked off during the preceding period of float with no voltage applied. Thus, reapplication of the coloring voltage for a short period, for example 10 seconds, or thereabouts, suffices. Naturally, the specific durations of these first applied voltage, float and subsequent applied voltage periods are determined by factors such as the memory time constant of the device, its coloration speed of response at various temperatures, its design and construction and the degree of loss of transmission that is deemed tolerable.

Figure 3:
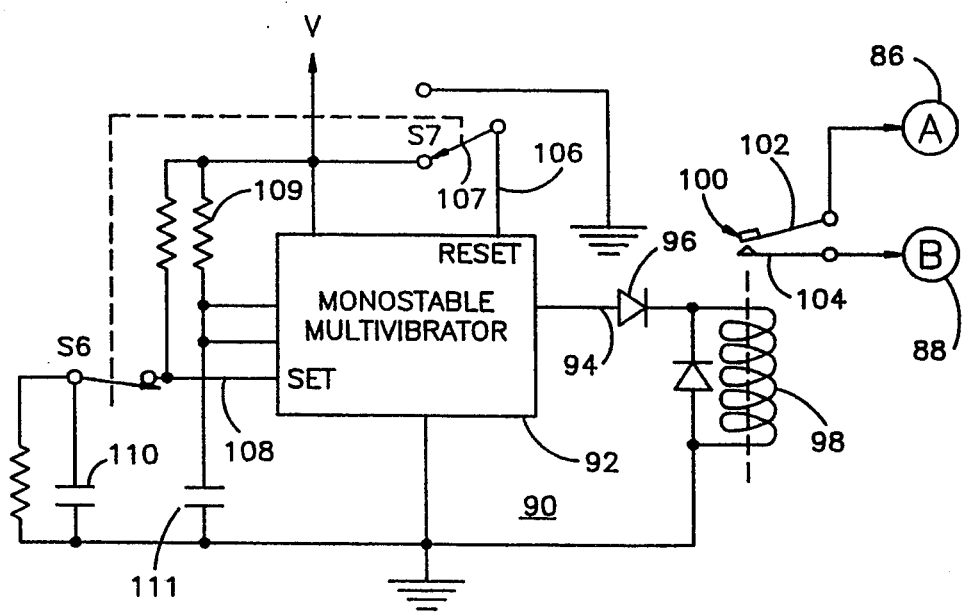
FIG. 3 is an electrical schematic diagram of a circuit that is useful with the systems in FIGS. 1 and 2.

Junction 58' in drive circuit 14' may be interrupted and input terminals 86, 88 may be connected with a bleach drive circuit 90 (FIG. 3). Bleach drive circuit 90 includes a monostable multivibrator 92 having an output on line 94 which is connected through a forward poled diode 96 to the coil 98 of a relay, generally shown at 100. Relay 100 includes contacts 102, 104 which connect, respectively, with terminals 86 and 88. It bears repeating that when circuit 90 (FIG. 3) is combined with circuit 14' (FIG. 2), junction 58' between terminals 86 and 88 is broken such that the selective closure of contacts 102 and 104 interconnects bleach signal source 16 with terminals 54, 56 of EC element 12, if switch S3 is closed. Bleach drive circuit 90 further includes a reset input 106 connected with a switch S7 and a set input 108 connected through a switch S6 to ground. Capacitor 111 determines the pulse width produced on output line 94. Switches S1–S7 are ganged in circuit 10' such that, when switch S1 is opened to bleach EC element 12, switches S3 and S6 close, switch S4 is connected to ground and switch S7 is connected to V.

The purpose of bleach drive circuit 90 is to connect bleach signal source 16 with terminals 54, 56 of EC element 12 for a period $T_4$, which is sufficient to increase the light transmission parameter of EC element 12 to the level established by signal source 16, after which the bleach signal source 16 is isolated from the EC element. This is accomplished by closing switch S6 and switching contact 107 of switch S7 to voltage source V. When this occurs, output 94 switches high, which energizes relay 100 to interconnect contacts 102 and 104. Output of monostable multivibrator 92 will remain high for the period $T_4$ as established by the values of capacitor 111 and resistor 109. At the end of such period $T_4$, output line 94 switches to a low state which deenergizes relay 100, causing contacts 102 and 104 to separate. As previously stated, this causes the bleach signal source to be isolated from EC element 12. In this manner, the bleach signal is applied to the EC element 12 only for the period $T_4$ required to bleach the EC element. By removing the bleach signal source from the EC element, the wasteful draw of current from the bleach signal source 16 is avoided. Thus, during extended periods when it is desired to maintain maximum light transmission through EC element 12, there is no sustained current draw through the EC element.

Figure 4:
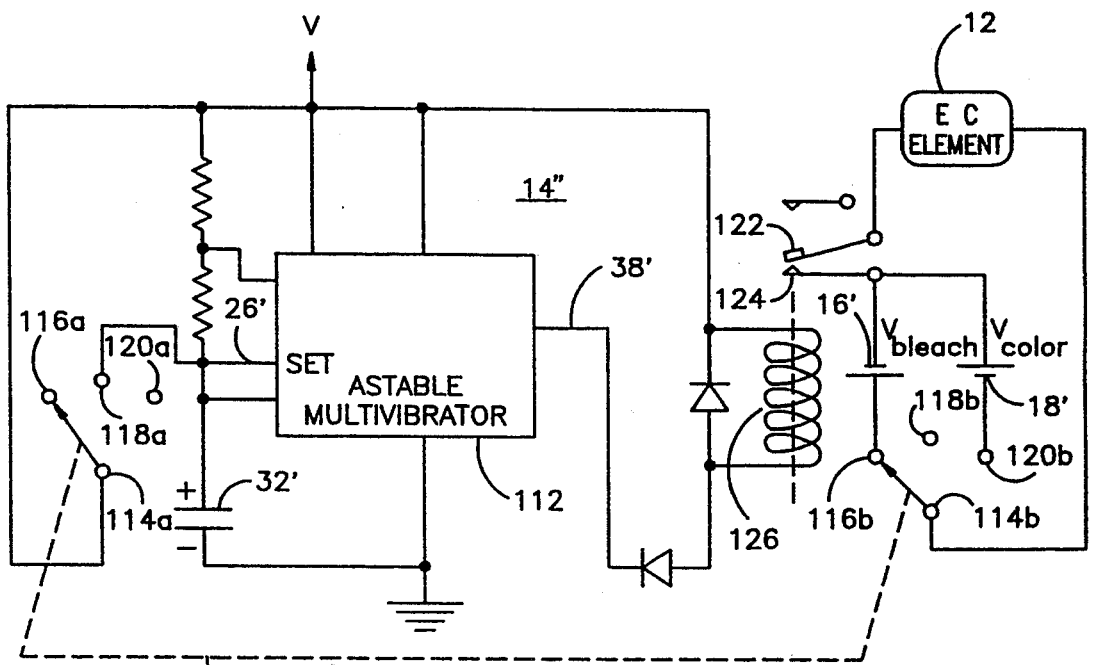
FIG. 4 is an electrical schematic diagram of another embodiment of a variable electrochromic light transmission system according to the invention.

Some electrochromic devices, if left open-circuited in their bleach state of maximum light transmission, have a tendency to self-develop coloration due to photolytically-induced or atmospherically-induced reactions, or the like. The drive circuit 14" illustrated in FIG. 4 causes the bleach voltage to be periodically re-applied to the EC element 12 in order to avoid such self-developed coloration. Drive circuit 14" additionally have the benefit that a single astable multivibrator 112 is used to selectively apply the bleach signal and the color signal to the EC element 12.

Drive circuit 14" includes an input switch 114 having first portion 114a and second portion 114b, mechanically connected. Each switch portion 114a, 114b has three positions: a bleach position, a central reset position and a color position, represented by fixed contacts 116a, 116b; 118a, 118b and 120a, 120b. When the movable contacts of switch elements of 114a, 114b interconnect with bleach contacts 116a, 116b, bleach signal source 16' is connected across EC element 12 whenever movable contact 122 contacts fixed contact 124. Contacts 122, 124 are controlled by relay coil 126 which is alternatingly energized and de-energized in response to an output signal on line 38' of a multivibrator 112.

When it is desired to color the EC element 12, switch 114 is changed such that the movable contacts of elements 114a, 114b are switched to "color" fixed contacts 120a, 120b. During the transition, the movable contacts momentarily "reset" fixed contacts 118a, 118b. When this occurs, output 38' of multivibrator 112 is reset to a low state. Accordingly, when the movable contacts of switch elements 114a, 114b are switched into engagement with "color" contacts 120a, 120b, multivibrator 112 will begin a period $T_1$ during which relay coil 126 is energized. Color signal source 118 will be applied across EC element 12 whenever contacts 122 and 124 are in engagement in response to the energizing of coil 126. Thus, when switch 114 is placed in the "color" mode, the color signal source is periodically applied to element 12, beginning with a complete period of application. Likewise, when switch elements 114a, 114b are switched back into engagement with "bleach" contacts 116a, 116b, multivibrator 112 will be reset to periodically apply the bleach signal source to element 12 beginning with a complete period of application. This ensures that the drive circuit 14" will not be in a "holding" period $T_2$ when it is desired to either bleach or color the EC element. This eliminates the delay that would result from an attempt to color or bleach the EC element during such a holding period.

Optionally, a monostable multivibrator, or equivalent, and suitable switching means can be added in parallel to circuit 14" so that, upon selection of either coloration or bleaching, a signal, as schematically shown in FIG. 6, can be applied during both coloration and bleaching. Also, and of particular advantage in automotive applications where power load, particularly on the battery when parked, is a critical factor, it is desirable that, during the holding periods, as much as is practical of the circuit elements needed to provide the bleach and color voltages be disconnected from the primary power rail Thus, in 14", another contact (not shown) on relay coil 126 can be used to appropriately disconnect, during holding periods, portions or all of the circuitry used to provide $v_{bleach}$ and $v_{color}$ and so achieve further energy saving.

Instead of a single color level input selection as provided by switch 114, a stepped input switch 130 allows the selection of discrete color level drive signals by allowing switch element 132a to selectively engage different-value resistors 134a, 134b, 134c and 134d. A second switch element 132b, which is mechanically interlocked with element 132a, engages one of a plurality of fixed contacts 136a, 136b, 136c and 136d, each of which is connected with voltage $V_{source}$. Thus, as switch element 132a selectively engages a resistor 134a–134d to select a different output voltage on line 138 extending to the EC element 12, switch element 132b is momentarily disengaged which pulls the base of a transistor 131 to ground which in turn, causes collector 133 to go high in order to send a "set" pulse to line 26' of drive circuit 14". Therefore, multivibrator 112 will energize relay coil 126 to reset the initial time period whenever selector switch 130 changes the selected color level of EC element 12.

At any time during the coloration cycle (either while the device is being colored with voltage applied, or during the period when the coloration attained is being substantially sustained by the device memory with the coloration voltage temporarily disconnected), it may be desirable to select some other coloring voltage to change the transmission of the device to some level different that that currently selected. Thus, it is desirable to provide means that allow the user benefit both from the continuous variability in transmission achievable with EC devices and to benefit from the memory inherent in said EC devices. Such sensing circuit 130 is necessary to ensure that, should the coloration voltage be changed during the period or float when the coloration voltage is not being applied to the EC element, then the timer circuit will reset and the first cycle of the new duty cycle will commence with the voltage being applied at the newly desired value.

Note that, when a new coloring voltage is selected so as to change the transmission of the device to some new level of partial transmission, this is achieved by circuit 130 without bleaching the EC device. This is an important feature of these specialized circuits. A user who desires to change the currently selected level of partial transmission to some new level (for example, from a 30% transmission level to a 15% transmission level) would find it undesirable if, during this change, the device momentarily bleached to its high transmission state.

Figure 7:
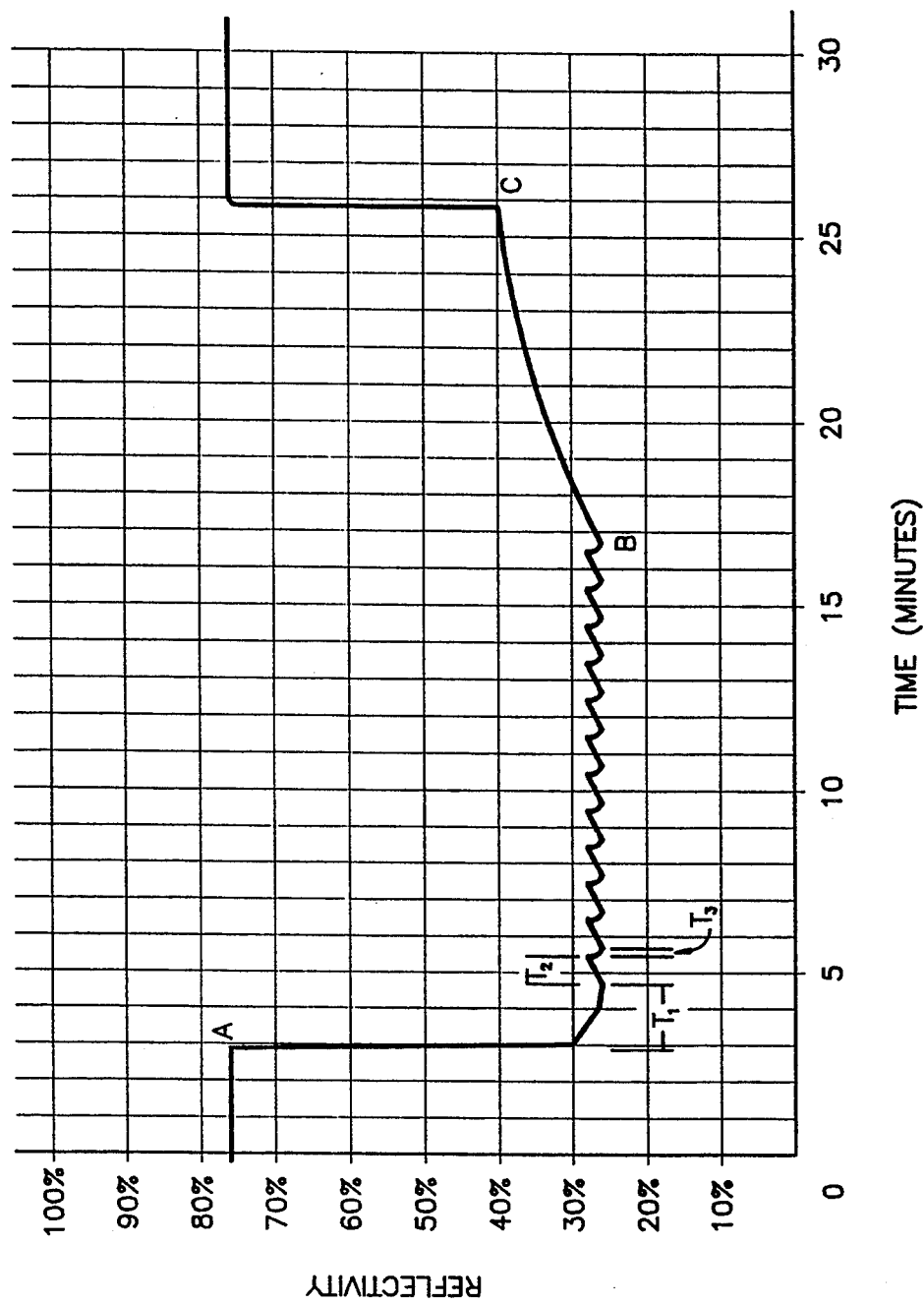
FIG. 7 is a chart illustrating the response of an electrochromic rearview mirror to the drive signals in FIG. 6.

To demonstrate the application of the concepts of this invention to an electrochromic mirror element, an all solid-state electrochromic rearview mirror of relatively short memory characteristic and of the type disclosed in U.S. Pat. No. 4,712,879 issued to Niall R. Lynam et al. and entitled ELECTROCHROMIC MIRROR, the disclosure of which is hereby incorporated herein by reference, was dimmed to a comfort level of around 25.5% reflectance by applying a 1.5 V coloring potential using the sequence of signals illustrated in FIG. 6. The initial coloration period $T_1$ was 100 seconds, the holding period $T_2$ was 45 seconds and the re-coloration period $T_3$ was 20 seconds. A record of the time variation of reflectivity for such an electrochromic mirror so powered is shown in FIG. 7. As can be seen in portion A to B of the graph, the mirror reflectivity remained close to the selected initial reflectance level of 25.5%. This compares favorably to portion B to C of the graph which shows a steady rise in reflectivity subsequent to point B at which the duty cycling circuitry was disabled and the mirror allowed to float with no applied potential, solely relying on memory to sustain coloration. At point C, the mirror was bleached by applying negative 0.8 V.

To demonstrate the application of the concepts of this invention to an electrochromic window element, a laminate electrochemichromic window of moderately long memory characteristic was used, which was of the type disclosed in U.S. Pat. No. 5,142,407 "Method of Reducing Leakage Current in Electrochemichromic Solutions and Solutions Based Thereon" issued to Desaraju Varaprasad et al, the disclosure of which is hereby incorporated herein by reference. The window incorporated an electrochromic medium, of nominal 150 microns thickness, comprising 0.03M ethylviologen perchlorate, 0.03M 5,10-dihydro-5,10-dimethylphenazine and 0.06M tetraethylammonium perchlorate dissolved in a 90%:10% (wt/wt) mixture of cyanoethylsucrose and glutaronitrile. The window was dimmed to a partial transmission level of approximately 17% by applying a 1.0 V coloring potential using the sequence illustrated in FIG. 6. The initial coloration period $T_1$ was 10 minutes, the holding period $T_2$ was 30 minutes and the recoloration period was 3 minutes. This sequence maintained the transmission close to the selected initial transmission level of 17% for at least 16 hours.

Figure 8:
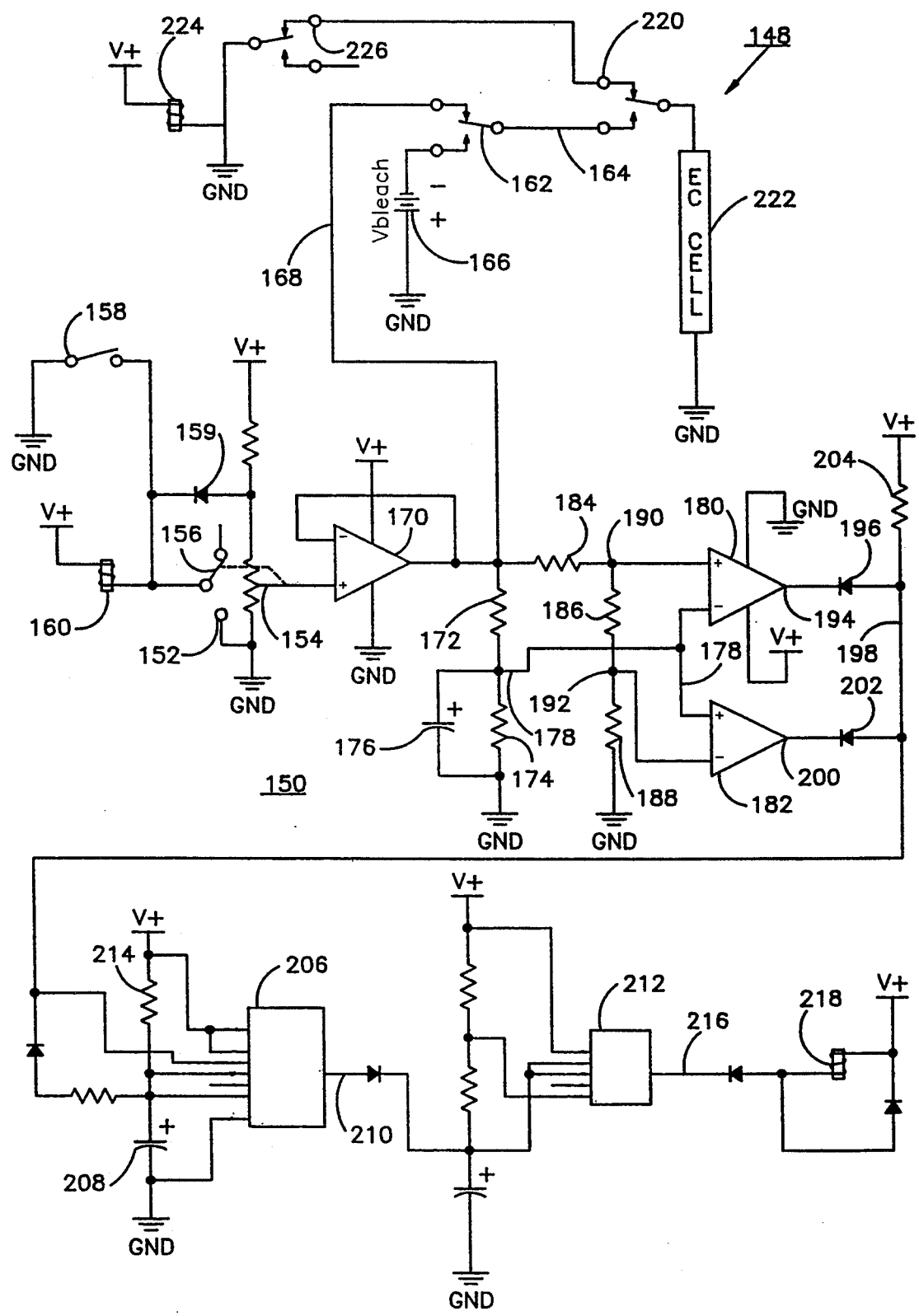
FIG. 8 is an electrical schematic diagram of another embodiment of a variable electrochromic light transmission system according to the invention.

Another embodiment of a variable electrochromic light transmission system 148 includes an EC drive circuit 150 having a user adjustable input means, generally shown at 152, that allows the user to set a desired transmission level, such as a partial transmission level or, at one extreme a maximum transmission level and at the other extreme a minimum transmission level (FIG. 8). Input means 152 includes a variable resistor 154 and a parallel switch 156 that is operated in response to the same movement that adjusts the variable resistor 154. A second input device 158 provides means for selecting a maximum transmission level, upon selection. A relay coil 160 is provided for selectively switching a set of relay contacts 162. Relay coil 160 is energized upon the actuation of either switch 156, at the high transmission setting of input means 152, or maximum transmission override switch 158. Contacts 162 interchangeably connect a line 164 between a bleach signal source 166 or a color voltage line 168. A diode 159, connected between one terminal of variable resistor 154 and one contact of input device 158, pulls the voltage produced on the wiper of resistor 154 to a low value whenever input device 158 is actuated, for a purpose that will be set forth below.

An amplifier 170, which configures as a voltage-follower, amplifies a signal provided to its non-inverting input from the wiper of variable resistor 154 to produce color voltage signal on line 168. A resistor 172 is connected between line 168 and a parallel combination of a resistor 174 and a capacitor 176. The junction 178 between resistors 172 and 174 is provided as a reference signal to the negative input of an comparator 180 and the positive input of another comparator 182. A voltage divider including series resistors 184, 186, 188 provide scaled values of the color voltage on line 168 at a junction 190, which is connected to the positive input of comparator 180, and junction 192 which is connected to the negative input of comparator 182. An output 194 of comparator 180 is connected through a diode 196 to a junction 198. A output 200 of comparator 182 is connected through a diode 202 to junction 198. Junction 198 is connected through a pull-up resistor 204 to voltage source V.

Under stable operating conditions, the voltage on junction 190 is above that on reference line 178, which is above the voltage on junction 192. In this state, both comparators 180 and 182 have open-circuit outputs which allows junction 198 to be pulled high through resistor 204. If the voltage on color voltage line 168 either increases or decreases at a rate or magnitude that is greater than a predetermined amount, the output of one of comparators 180, 182 will be pulled low. After a period of time following the occurrence, as determined by the time constant of resistor 174 and capacitor 176, the reference voltage on line 178 will adapt to the change in the color voltage level on line 168 and the outputs of both comparators 180, 182 will again be high. Likewise, if the rate or magnitude of change of voltage on color voltage line 168 is below the predetermined values, comparators 180, 182 will not change state.

Junction 198 is provided as a trigger input to a monostable multivibrator 206. The output 210 of multivibrator 206 is provided as a disable input to an a stable multivibrator 212. Whenever junction 198 goes low, output of multivibrator 206 on line 210 goes high for the duration of the period established by resistor 214 and capacitor 208. The resulting high output on line 210 disables output 216 of multivibrator 212. Output 216 is connected with a relay coil 218 whose contacts 220 extend between line 164 and a terminal of EC cell 222. Contacts 220 additionally extend to a loss-of-voltage sensing relay coil 224 and its corresponding contacts 226.

The grounding of junction 198 in response to a sufficient rate or magnitude of change in color voltage line 168 causes capacitor 208 to be discharged and output 210 of multivibrator 206 to be high for a predetermined period of time. During this period, output 216 is low which keeps relay coil 218 energized which connects EC cell 222 with the color voltage on line 168. After this period has expired, output 210 goes low which allows output 216 to go high, de-energizing relay coil 218. This causes relay contacts 220 to disengage from color voltage line 168. Multivibrator 212 subsequently alternates the states of output 216 which will then alternate the condition of relay coil 218 and its associated contacts 220 in order to repetitively connect EC cell 222 to color voltage line 168.

Whenever relay coil 160 is energized in response to either input switch 156 or 158, relay contacts 162 are switched in order to connect the EC cell 222 to a source of bleach voltage 166. In addition to energizing relay 160 the closure of either input switch 156 or 158 causes diode 159 to be forward-biased. This forces the voltage on the wiper of resistor 154 to abruptly drop. This, in turn, causes a rapid change in the level of the color voltage on line 168 which resets monostable multivibrator 206 in a manner previously described. Therefore, whenever a high transmission state is selected for the EC element by closure of either switch 156 or 158, bleach voltage 166 is applied to the EC-element and the sequencing of pulsed application of the bleach in voltage is reset in order to begin with a long pulse. If the supply of voltage V is removed from circuit 150, relay coil 224 and 228 drop out which connects EC cell 222 to ground. This is provided in order to rapidly bleach the EC cell upon interruption of its power supply.

Thus, as described above, circuit 148 includes several distinct sections. A color/bleach control section, comprising partial transmission selection means 152 and day override means 158, provide continuously variable control over the state of transmission of EC cell 222. As an example, input means 152 could be a combination potentiometer and switch with the potentiometer wiper set to sweep from 0 volts to the maximum color voltage (positive) allowed. Typically, this potentiometer is user set to select some voltage to achieve a desired level of partial transmission for EC cell 222. Once so selected, the duty cycle generating section, comprising monostable 206 and astable 212, periodically apply and remove the desired coloration voltage, according to the signal sequence schematically shown in FIG. 6, by energizing and deenergizing relay coil 218. Whenever a change (to a larger or smaller voltage level) on the already established color voltage level is selected by adjustment of input means 156, this change is sensed by the transmission change sensing section which comprises comparators 180, 182 along with resistors 172, 174, 184, 186, 188 and capacitor 176. As described above, if the color voltage to be applied to EC cell 222 is changed either up or down by a percentage (determinable by the resistances of resistors 184, 186, 188), then this change is sensed by one of the comparators which then, in turn, triggers monostable 206 in the duty cycle generating section to apply the changed color voltage level EC cell 222 by energizing relay coil 218 to close contact 220 to line 164. When input 156 ceases to be changed so that the voltage on line 168 again become stable, the reference to the comparators readjusts and thereafter, the newly selected color voltage level is periodically applied and removed from EC cell 222 under the control of astable 212.

Again is should be noted that circuit 148 allows the user benefit both from the continuous variability in transmission achievable with EC devices and to benefit from the memory inherent in said EC devices. Using the means described in circuit 148, the user can at any time select a new partial transmission level, or select at any time the bleach state. This can be achieved regardless of whether, upon initial desire to change color voltage, the EC element is in a color or holding period of the signal sequence schematically shown in FIG. 6.

In the previous circuits, the coloring voltage levels once selected by the variable voltage means that enables user selection of any one level of partial transmission within the range of capability of the EC element, remains constant in magnitude during the periods it is applied. Thus, for example, if a voltage of 1.6 V is selected in order to dim the EC element to a desired partial transmission level, the previous circuits would periodically apply and remove this 1.6 V applied potential according to the signal sequence schematically illustrated in FIG. 6. This gives satisfactory performance in many applications. However, in some applications, it may be desirable to momentarily use a different applied voltage immediately following initial selection of some new level of partial transmission for the EC element. For instance, if the newly selected partial transmission level of the EC element is dimmer (more light attenuating) than that formerly selected, it would be desirable to initially and momentarily select a somewhat larger applied potential than that ultimately desired in order to power the EC element more rapidly to the newly desired partial transmission level. Further, the back electromotive force built up within the EC medium allows the use of a lower sustaining voltage than that used in the initial coloration.

For example, if an EC element was presently at a 30% transmission level under 1.4 volts applied potential and it was desired to achieve 20% transmission by applying 1.5 volts, then it may be desirable to apply 1.6 to 1.7 volts, or thereabouts, momentarily for more rapid achievement of the 20% transmission level and thereafter apply 1.5 volts to sustain this level. However, if the newly selected partial transmission level of the EC element is less dim (less light attenuating) than that formerly selected, it would be desirable to initially and momentarily select a somewhat lower applied potential than that ultimately desired in order to power the EC element more rapidly to the newly desired partial transmission level. For example, if the EC element was presently at a 30% transmission level under 1.4 volts applied potential and it was desired to achieve 40% transmission by applying 1.3 volts, then it may be desirable to apply 1.1 to 1.2 volts, or thereabouts, momentarily for more rapid achievement of the 40% transmission level and thereafter apply 1.3 volts to sustain this level. The duration and magnitude of overvoltage (or undervoltage) to apply may be predetermined based on the specific device construction, the rapidity desired for change between one partial transmission level and another, the precision required for the transmission level during the initial period, the response time and memory time constant of the device. In general, the initial overvoltage or undervoltage is typically 5% to 10% greater (or lower) than the subsequent voltage. However, and particularly when applied for a relatively short duration, the difference between the initial and sustaining voltage can be greater.

Note, however, that most EC elements have an upper limit on the magnitude of the applied voltage. If too large a voltage is applied, degradation in the EC element can be stimulated. Thus, it is important that some capping mechanism be provided to ensure that the applied potential cannot exceed some predetermined maximum allowed applied voltage.

Figure 9A:
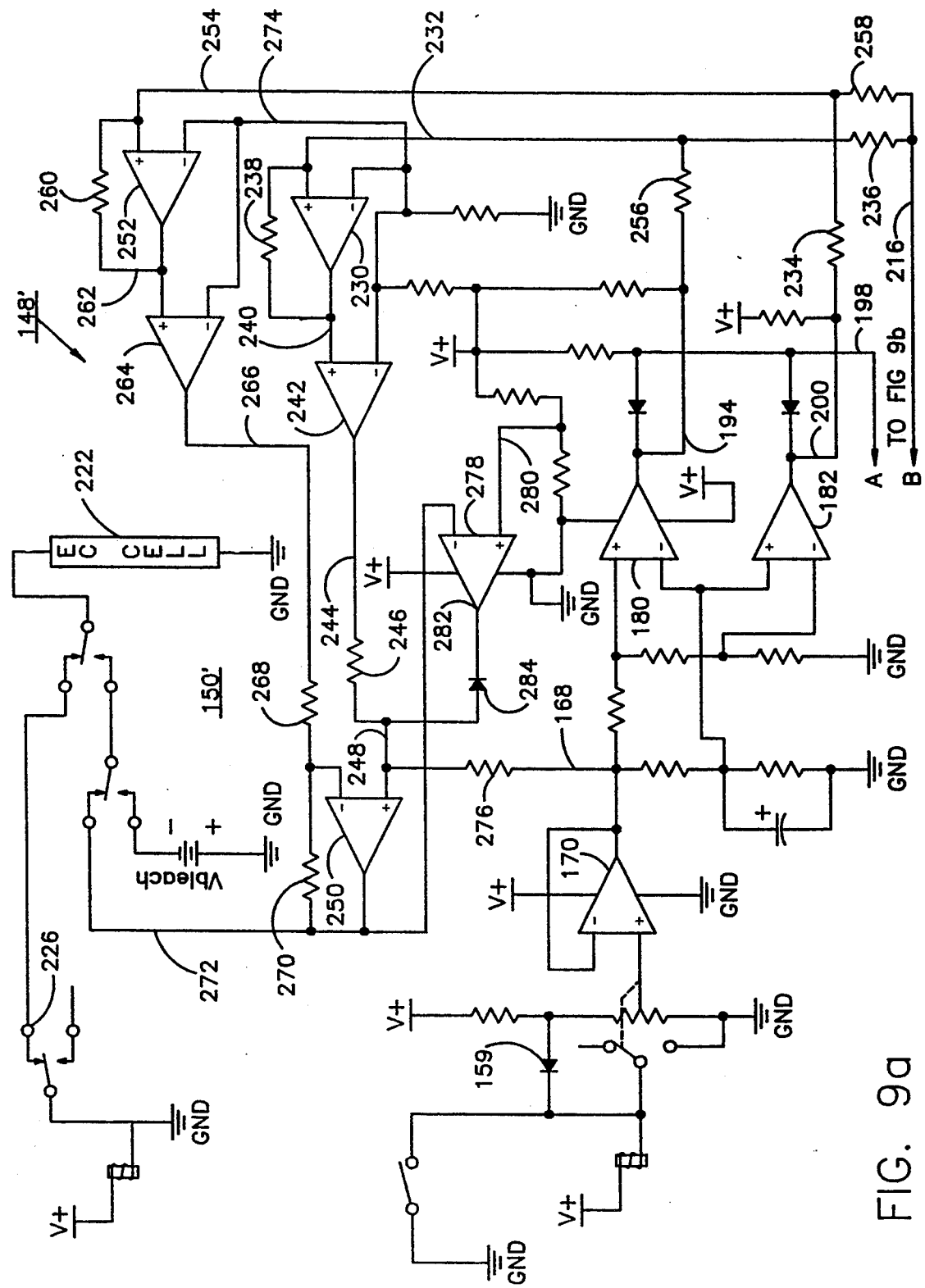
FIGS. 9a and 9b are an electrical schematic diagram of yet another embodiment.
Figure 9B:
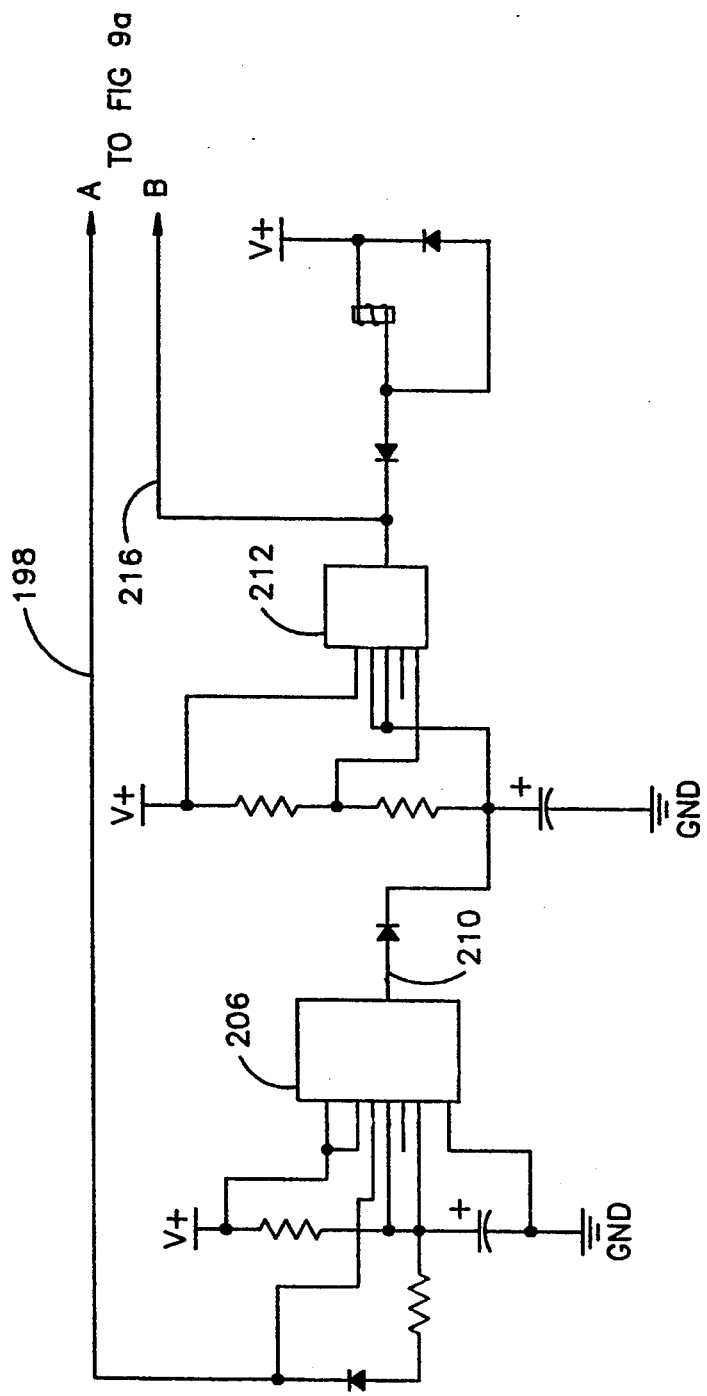

A variable electrochromic light transmission system 148' including an EC drive circuit 150' combines the concepts outlines above with a constantly variable control circuit that also beneficially utilizes the memory capability of the EC element (FIG. 9). This circuit senses whether the control input is changed to dim the EC element to a more light attenuating level, or whether the control input is changed to de-color the EC element to a less light attenuating level. If dimming, the circuitry applies a larger voltage for a part or for the full duration of the initial coloration period than that applied during the subsequent recoloration periods. If de-coloring, the circuitry applies a smaller voltage for a part or for the full duration of the initial coloration period than that applied during the subsequent recoloration periods. An upper limit is placed upon how large a voltage can be applied, so protecting the EC element from potential damage. At any time, whether it be during an initial coloration period, during a holding period when no potential is applied, or during a recoloration period, a new partial transmission state for the EC element can be selected by adjustment to the input control, or the bleached state can be achieved by selecting the bleach voltage.

EC drive circuit 150' includes overshoot and undershoot circuit means that are responsive to changes in the color voltage level in order to overcome apparent hysteresis of the applied voltage and transmistivity of the EC element. An amplifier 230 is provided having its non-inverting input 232 connected through a resistor 256 to output 194 of comparator 180. Input 232 is also connected through a resistor 236 to output 216 of multivibrator 212. A feedback resistor 238 connects output 240 of amplifier 230 with its non-inverting input 232. Output 240 is provided to the positive input of a comparator 242 whose output 244 is connected through a resistor 246 to the non-inverting input 238 of an amplifier 250. Another amplifier 252 is provided having its non-inverting input 254 connected through a resistor 234 to output 200 of comparator 182. Input 254 is also connected through a resistor 258 to output 216 of multivibrator 212. Amplifier 252 additionally includes a feedback resistor 260 connected between its output 262 and input 254. Output 262 is, in turn, connected with the positive input of a comparator 264 whose output 266 is connected through a resistor 268 to the inverting input of amplifier 250. A feedback resistor 270 is provided between output 272 of amplifier 250 and its inverting input. The inverting inputs of amplifiers 230 and 252, and the negative inputs of comparators 242, 264 are connected with a reference voltage line 274 which is held at a constant reference voltage.

In operation, an increase in the color voltage level on line 168, which decreases the transmission level of the EC element 222, causes output 200 of comparator 182 to go low. Monostable multivibrator 206 and astable multivibrator 212 in turn, cause output 216 to also be low, initially. This causes input 254 to drop below the level of reference line 274 causing output 262 of amplifier 252 to be low. Feedback resistor 258 latches output 262 low even after one of the outputs 200, 216 goes high. The low level of output 262 causes output 266 of comparator 264 to be pulled to ground. With output 262 grounded, resistor 268 combines with feedback resistor 270 to establish the gain of amplifier 250 at greater than unity. Accordingly, amplifier 250 produces a voltage on output 272 which is greater than the voltage level on color voltage line 168. The amplification provided by amplifier 250 is established by the ratio between resistors 268 and 270 and is, in the illustrative embodiment, a gain of 1.1. After the passage of time, as determined by the time constant of capacitor 176 and resistor 174, output 200 will again be switched to a high level. This will not change the status of amplifier 252 because it is configured as a latch. However, when output 216 of multivibrator 212 also switches high, the resulting increase in the voltage level on input 254 will cause output 262 to switch to a high state. This will cause comparator 264 to switch output 266 to float which effectively removes resistor 268 from the circuit such that the gain of amplifier 250 is unity. Thus, it can be seen that EC drive circuit 150' produces an initial voltage overshoot for EC cell 222 followed by sequence of recoloration pulses having a voltage level determined by the output of amplifier 170.

When the voltage level on line 168 is reduced, resulting in an increased transmistivity of EC element 222, output 194 goes low which, in combination with the switching of output of 216 low, causes input 232 of amplifier 230 to be below the reference voltage line 274. This causes output 240 to be switched low which allows output 244 of comparator 242 to be clamped to ground. This causes resistor 246 to combine with resistor 276 in a voltage divider circuit such that the voltage at input 248 to amplifier 250 is less than the color voltage on line 168. This causes the color voltage level on line 272 to be less than the color voltage level on line 168 which creates an initial undershoot during the reduction of the color voltage. After output 194 goes high, this condition will persist as long as output 216 remains low during the initial pulse. When both outputs 194 and 216 switch high, output 240 switches high and output 244 floats. This effectively removes resistor 268 from the circuit such that the voltage provided to input 248 is the same as the color voltage on line 168. With the gain of amplifier 250 at unity, the color voltage on line 272 will be essentially the same as on line 168. Accordingly, subsequent re-coloration pulses will have a greater level than the initial pulse which is subject to undershoot.

EC drive circuit 150' also provides overvoltage protection for EC cell 222. An amplifier 278 has its inverting input connected with color voltage line 272 and its non-inverting input connected with a reference voltage line 280 which is kept at a constant voltage established as the maximum safe level of voltage to be provided to EC cell 222. If the voltage on power voltage line 272, provided to EC cell 222, increases above the reference voltage level of line 280, the output 282 of amplifier 278 will switch low clamping input 248 of amplifier 250 below a safe level through a diode 248. At all other times, output of amplifier 282 is high which back-biases diode 284 in a manner that negates any effect on input 248.

Figure 11:
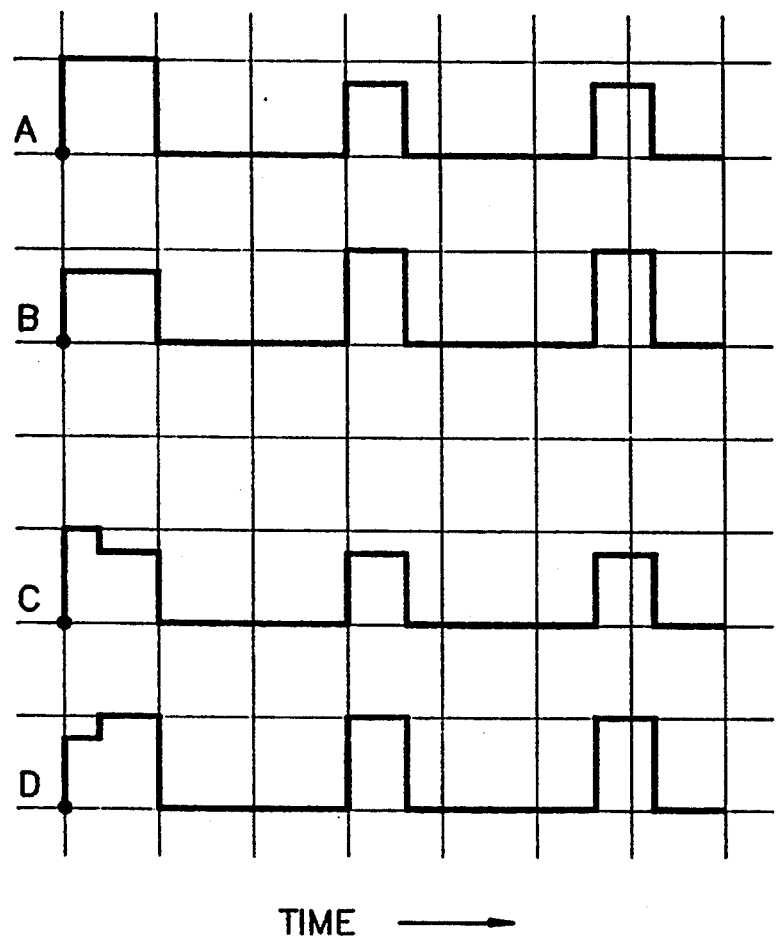
FIG. 11 is a chart illustrating sequences of drive signals occurring in the circuits schematically diagrammed in FIGS. 9 and 10.

A schematic of the signal sequence output by circuit 150' to power the EC element is shown in graphs A and B of FIG. 11. Graph A shows the overvoltage/overshoot when the EC element is selected to dim from a partial transmission level to some other more light attenuating, dimmer partial transmission level. Graph B shown the undervoltage/undershoot when the EC element is selected to decolor from a partial transmission level to some other less light attenuating, less dim partial transmission level. Note that in graphs A and B, the overvoltage or undervoltage is selected for the full duration of the initial coloration period. In some circumstances, it can be advantageous that, as shown in graphs C and D, the overvoltage/undervoltage be selected for only a portion of the first coloration period. For example, it can be desirable to select a relatively large overvoltage/undervoltage (20% to 30% for instance) in order to more rapidly change between partial transmission levels but it may also be desirable to limit the time duration said overvoltage/undervoltage is selected. Further, it is advantageous that this duration of selection of the overvoltage/undervoltage be dynamic in that it be longer when a large change in partial transmission levels is selected (70% transmission down to 10% transmission, for example) and be shorter for a small change in transmission levels (40% transmission down to 30% transmission, for example).

Figure 10A:
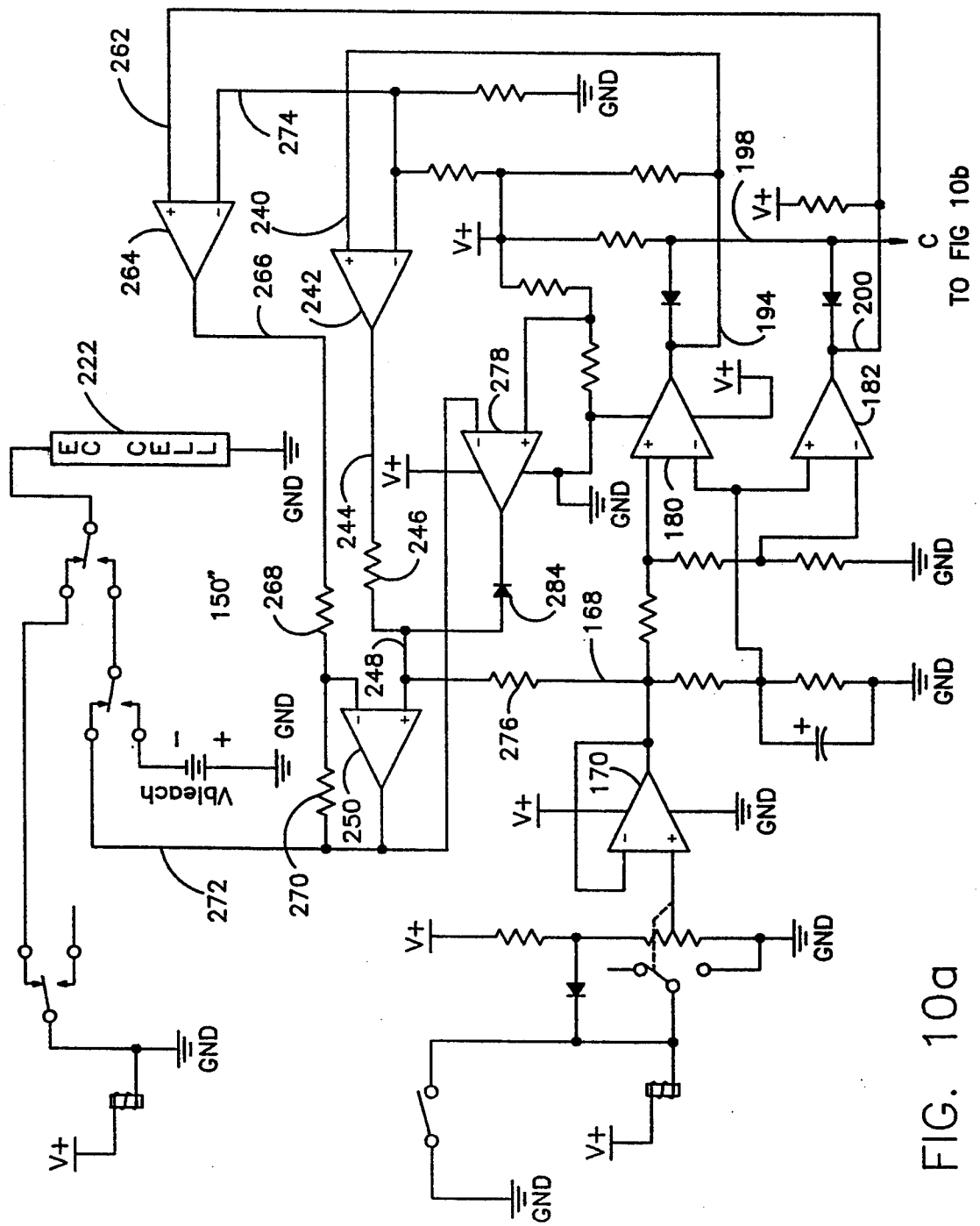
FIGS. 10a and 10b are an electrical schematic diagram of yet another embodiment.
Figure 10B:
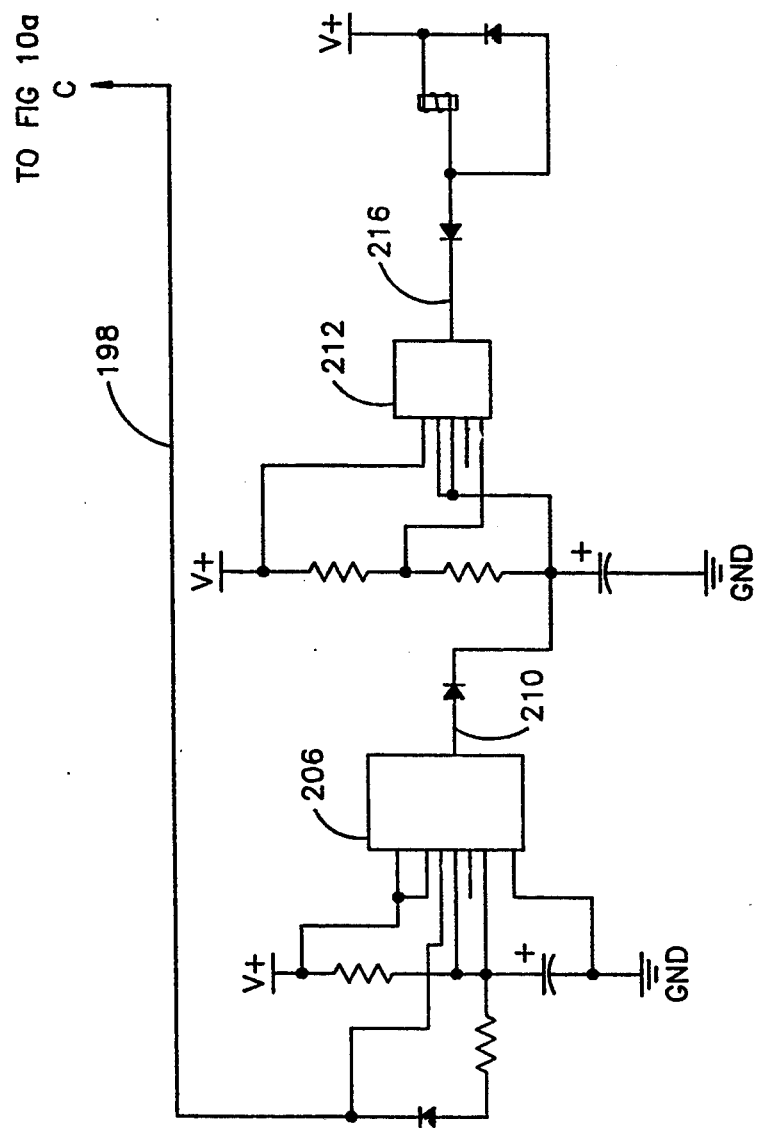

An EC drive circuit 150" is provided which is similar to drive circuit 150' except that the undershoot or overshoot period lasts only for a portion of the initial coloration period (FIG. 10). The length of the undershoot/overshoot is proportional to the magnitude and rate of change of the color voltage level on line 168. In EC drive circuit 150", input 262 of comparator 264 is connected directly with output 200 of comparator 182 and input 240 of comparator 242 is connected directly with output 194 of comparator 180. Accordingly, whenever the voltage level on color voltage line 168 abruptly increases, the output 200 of comparator 182 will switch low causing the output of comparator 264 to be pulled to ground. This effectively combines resistor 268 with resistor 270 to establish the gain of amplifier 250 at greater then unit. Because of the greater-than-unity amplification of amplifier 250, the color voltage signal on line 272 will be greater than that on line 168. After a period of time, determined by the magnitude and rate of change of the voltage on line 168 and the time constant established by resistor 174 and capacitor 176, output 200 will again switch high which will cause comparator 264 to float its output 266. This effectively removes resistor 268 from the circuit such that the gain of amplifier 250 is unity and the overshoot is terminated.

Similarly, if the voltage level on line 168 is abruptly reduced, output 194 will switch low which will cause comparator 242 to switch its output 266 to ground. This will cause resistor 246 to form a voltage divider, in combination with resistor 276. Accordingly, the voltage on line 272 will be less than that on line 168. After the output 194 of comparator 180 again switches high in response to the charging of capacitor 176, comparator 242 will switch its output 244 to a floating state which will effectively remote resistor 246 from the circuit such that the input 248 to amplifier 250 will equal the color voltage on line 168. From this point onward, the voltage level on line 272 will be essentially the same as that on line 168. The initial undershoot is illustrated in Chart D in FIG. 10.

Circuit 152" allows predetermination of the general portion of the initial coloration period during which the overvoltage/undervoltage is applied, but does so dynamically such that this portion is longer or shorter dependent on the size of the change desired for the partial transmission of the EC element.

It will be readily apparent to one skilled in the art that the examples provided herein are illustrative in nature. One skilled in the art could readily implement the invention utilizing discrete analog components, digital components or a programmed microprocessor. Other changes and modifications in the specifically described embodiments can be carried out without departing from the principles of the invention which is intended to be limited only by the scope of the appended claims, as interpreted according to the principles of patent law including the Doctrine of Equivalents.

The embodiments of the invention in which an exclusive property or privilege is claimed are defined as follows:

1. A variable electrochromic light transmission system comprising:
    an electrochromic element having a continuously variable transmission characteristic;
    said element being responsive to a momentary application of a signal by coloring to a partial light transmission level and being responsive to removal of said signal by maintaining a transmission level that is within a given percentage from said partial transmission level;
    said partial light transmission level selectable from a continuum of light transmission levels in a range from a highest light transmission level to a lowest light transmission level;
    input means for selecting a light transmission level of said electrochromic element;
    circuit means responsive to said input means for intermittently applying a drive signal to said electrochromic element in successive pulses separated by holding periods;
    said drive signal having a level corresponding to the selected light transmission level; and
    said circuit means being responsive to at least one of the magnitude and the rate of change of magnitude of said input means to provide momentary overshoot of said drive signal level upon a change in said input means that increases said drive signal level and momentary undershoot of said drive signal upon a change in said input means that decreases said drive signal level.

2. The system in claim 1 wherein said circuit means includes reset means responsive to changes in the value of said input means resetting said circuit means to apply the changed value of said input means at the start of one of said pulses.

3. The system in claim 2 wherein said input means includes continuously variable adjusting means for adjusting said transmission level.

4. The system in claim 3 wherein said circuit means includes bleach means for applying a bleach signal to said element and wherein said circuit means is responsive to said input means to apply the bleach signal at the start of one of said pulses.

5. The system in claim 1 wherein said circuit means provides each said overshoot and undershoot for a portion of the corresponding one of said pulses.

6. The system in claim 5 wherein the duration of said portion is a function of at least one of said magnitude and said rate of change of magnitude of said input means.

7. The system in claim 1 wherein said circuit means provides each said overshoot and undershoot for the entire corresponding one of said pulses.

8. The system in claim 1 including limiting means for limiting the magnitude of said drive signal to a predetermined level.

9. The system in claim 8 wherein said limiting means includes means for comparing said drive signal with a reference signal.

10. A variable light transmission system comprising:
    an electrochromic element having a continuously variable light transmission characteristic;
    said electrochromic element being responsive to a momentary application of a signal by coloring to a partial light transmission level and being responsive to removal of said signal by maintaining a light transmission level that is within a given percentage from the partial light transmission level for a given period of time defining a memory time constant for said electrochromic element;
    said partial light transmission level being selectable from a continuum of light transmission levels from a highest light transmission level to a lowest light transmission level;
    input means for selecting a light transmission level of said electrochromic element; and
    circuit means responsive to said input means for applying to said electrochromic element a value of said signal corresponding to the selected light transmission level, said circuit means applying said selected signal value for a first period of time in order to color said electrochromic element to said selected light transmission level and repetitively thereafter for second periods of time in order to maintain said selected light transmission level, said second periods being separated from said first period and from each other by holding periods of time during which said selected signal is not applied to said electrochromic element, said first period of time being at least approximately 100 seconds.

11. The system in claim 10 including sensing means responsive to changes in the value of the selected light transmission level by changing out of a holding period if in such holding period to a period of time that is not a holding period to apply the changed value of said signal.

12. The system in claim 11 wherein said sensing means is responsive to at least one of the magnitude and the rate of change of magnitude of said selected light transmission level.

13. The system in claim 10 wherein said input means includes discrete switch means for selecting from among a finite number of discrete light transmission levels.

14. The system in claim 13 including sensing means responsive to changes in the value of the selected light transmission level by changing out of a holding period if in such holding period to a period of time that is not a holding period to apply the changed value of said signal.

15. The system in claim 14 wherein said sensing means is responsive to said discrete switch means.

16. The system in claim 14 wherein said input means includes continuously variable adjusting means for adjusting said light transmission level.

17. The system in claim 10 wherein said electrochromic element is responsive to another signal for bleaching to a high light transmission state.

18. The system in claim 17 wherein said another signal is applied for a third period of time in order to bleach said electrochromic element to a high light transmission state and repetitively thereafter for fourth periods of time in order to maintain said high light transmission state, said fourth periods during which said second signal is applied being separated from each other and from said third period by holding periods.

19. The system in claim 17 wherein said another signal is applied momentarily for a third period of time in order to bleach said electrochromic element to a high light transmission state followed by a quiescent period during which said another signal is not applied.

20. The system in claim 17 wherein said signal is of a particular polarity and wherein said another signal is of an opposite polarity.

21. The system in claim 10 wherein said given percentage is 5%.

22. The system in claim 10 wherein said second period is of shorter duration than said first period.

23. The system in claim 10 further including a power supply for said circuit means and means for substantially disconnecting said circuit means from said power supply during said quiescent period.

24. The system in claim 10 wherein said electrochromic element is a device selected from the group including a vehicle rearview mirror, a vehicular window, a vehicular sunroof, a building window, a privacy partition and a security partition.

25. A variable light transmission system comprising:
an electrochromic element having a continuously variable transmission characteristic;
said electrochromic element being responsive to a momentary application of a first signal having a particular polarity by coloring to a partial light transmission level and being responsive to a momentary application of a second signal not having said particular polarity by bleaching to a high light transmission level, said electrochromic element responsive to removal of said signals by maintaining a light transmission level that is within a given percentage from the selected light transmission level for a given period of time defining a memory time constant for said electrochromic element;
said partial light transmission level being selectable from a continuum of light transmission levels from said highest light transmission level to a lowest light transmission level;
input means for selecting one of said first signal and said second signal; and
circuit means responsive to said input means selecting one of said first and second signals in order to achieve one of coloring said electrochromic element to a partial light transmission level or bleaching said electrochromic element to a high light transmission level, said circuit means applying to said electrochromic element a selected value of one of said signals corresponding to a partial light transmission level for a first period of time in order to color said electrochromic element to a partial light transmission level and repetitively thereafter for second periods of time in order to maintain the selected partial light transmission level, said second periods being separated from said first period and from each other by holding periods of time during which the selected signal is not applied to said electrochromic element, said circuit means applying to said electrochromic element the other of said signals to bleach said electrochromic element to a high light reflectance level.

26. The system in claim 25 including sensing means responsive to changes in the value of said one of said signals by changing out of a holding period if in such holding period to a period of time that is not a holding period to apply the changed value of said signal.

27. The system in claim 26 wherein said sensing means is responsive to at least one of the magnitude and the rate of change of said magnitude of said one of said signals.

28. The system in claim 25 wherein said input means includes discrete switch means for selecting between said first and second signals and, if said one of said signals is selected, selecting said value of said one of said signals from among a finite number of discrete transmission levels, 29. The system in claim 28 including sensing means responsive to changes in the value of said one of said signals by changing out of a holding period if in such holding period to a period of time that is not a holding period to apply the changed value of said signal.

30. The system in claim 29 wherein said sensing means is responsive to said discrete switch means.

31. The system in claim 25 wherein said input means includes continuously variable adjusting means for adjusting said transmission level.

32. The system in claim 25 further including a power supply for said circuit means and means for substantially disconnecting said circuit means from said power supply during said quiescent period.

33. The system in claim 25 wherein said given percentage is 5%.

34. The system in claim 25 wherein said second period is of shorter duration than said first period.

35. The system in claim 25 wherein said holding periods are of longer duration than each of said first and second periods.

36. The system in claim 25 wherein said electrochromic element is a device selected from the group including a vehicle rearview mirror, a vehicular window, a vehicular sunroof, a building window, a privacy partition and a security partition.

37. The system in claim 25 wherein said first period is at least approximately 100 seconds.

38. The system in claim 25 wherein said other of said signal has a polarity that is opposite said particular polarity.

39. The system in claim 25 wherein said other of said signals is applied for a third period of time in order to bleach said electrochromic element to a high light transmission state and repetitively thereafter for fourth periods of time in order to maintain said high light transmission state, said fourth periods during which said other of said signals is applied being separated from each other and from said third period by holding periods.

* * * * *

UNITED STATES PATENT AND TRADEMARK OFFICE
CERTIFICATE OF CORRECTION

Page 1 of 2

PATENT NO. : 5,384,578
DATED : January 24, 1995
INVENTOR(S) : Niall R. Lynam, Ian A. McCabe and Kenneth L. Schierbeek It is certified that error appears in the above-indentified patent and that said Letters Patent is hereby corrected as shown below:

Column 2, line 41:
    Before "application" insert --continued--.

Column 4, line 53:
    "valve" should be --value--.

Column 6, line 40: Second occur.
    "output" should be --Output--.

Column 8, line 54:
    After "64" insert --.--.

Column 11, line 19:
    After "rail" insert --.--.

Column 13, line 44:
    "a stable" should be --astable--.

Column 13, line 45:
    After "low," insert --the--.

Column 14, line 15:
    "EC-element" should be --EC element--;
    lines 17-18, close space between "a" and "long".

UNITED STATES PATENT AND TRADEMARK OFFICE
CERTIFICATE OF CORRECTION

PATENT NO. : 5,384,578
DATED : January 24, 1995
INVENTOR(S) : Niall R. Lynam, Ian A. McCabe and Kenneth L. Schierbeek

It is certified that error appears in the above-indentified patent and that said Letters Patent is hereby corrected as shown below:

Column 18, line 45:
    "remote" should be --remove--.

Column 22, line 17:
    "levels," should be --levels.--.

Signed and Sealed this

Third Day of October, 1995

Attest:

BRUCE LEHMAN

*Attesting Officer*     *Commissioner of Patents and Trademarks*